UNITED STATES PATENT OFFICE.

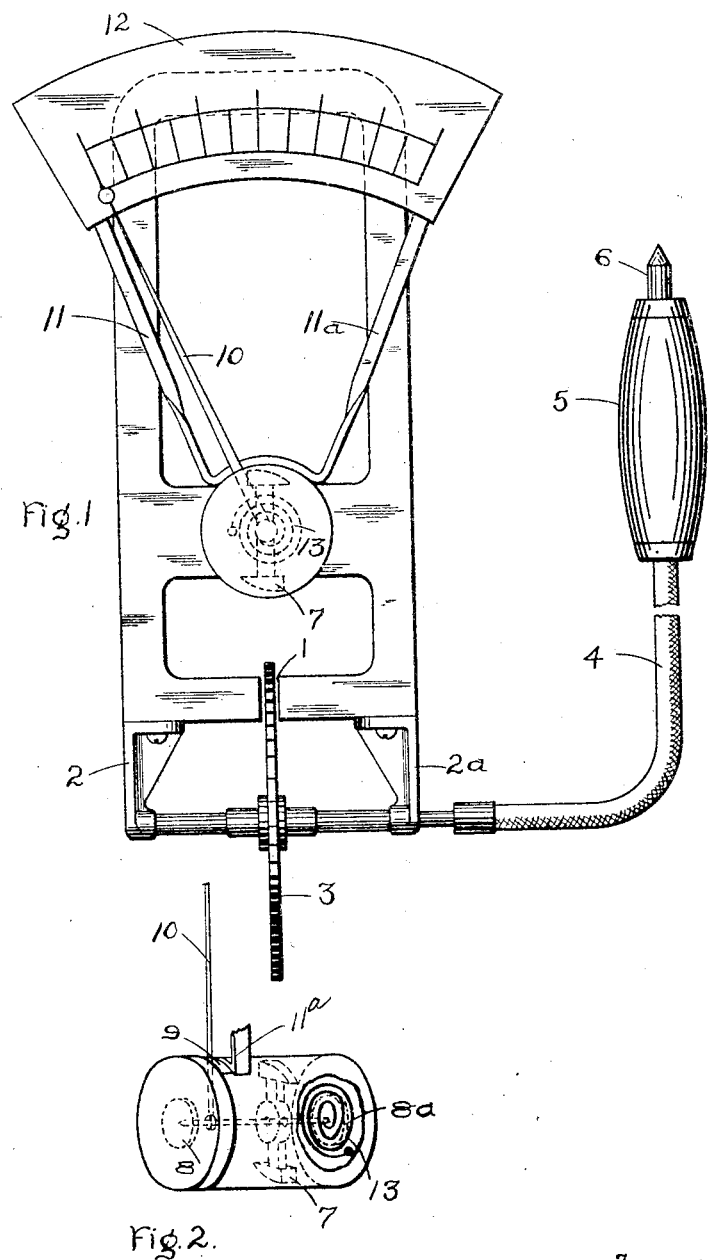

CARYL D. HASKINS, OF BROOKLINE, MASSACHUSETTS, ASSIGNOR TO GENERAL ELECTRIC COMPANY, A CORPORATION OF NEW YORK.

TACHOMETER.

No. 808,237.  Specification of Letters Patent.  Patented Dec. 26, 1905.

Application filed March 29, 1900. Serial No. 10,593.

*To all whom it may concern:*

Be it known that I, CARYL D. HASKINS, a citizen of the United States, residing at Brookline, in the county of Middlesex and State of Massachusetts, have invented certain new and useful Improvements in Tachometers, of which the following is a specification.

The object of my present invention is to provide a tachometer of greater simplicity and cheapness of construction than devices of that kind heretofore employed.

In carrying out my invention I provide an electric conductor or circuit movable relatively to a magnetic field and adapted to be driven by the rotating body whose speed is to be indicated. I provide an indicator or register by which the strength of the reaction between the moving conductor and the field may be indicated. The moving conductor I prefer to employ is a conducting-disk mounted so as to rotate in an air-gap between the poles of a magnet and provided with a flexible shaft to communicate to the disk the speed of the rotating body. The variation of magnetic reluctance of the air-gap under the influence of the rotating disk diverts a varying number of lines of force, according to the speed of the disk, through another portion of the magnetic circuit, in which is rotatably mounted under the tension of a spring or weight an armature carrying an indicator in operative relation to a scale.

In order to give greater range to the instrument, I provide a number of interchangeable indicators each provided with its own scale, the armature being inclosed within a metal tube to dampen the oscillations of the needle and render the instrument more or less dead beat.

The features of novelty of my invention will be hereinafter more particularly described and will be definitely indicated in the claims.

In the accompanying drawings, which illustrate one form of my invention, Figure 1 is a plan view of a device embodying my improvements. Fig. 2 is a detail view of the indicator.

1 represents an air-gap between the poles of a magnet, which may be a permanent magnet or an electromagnet; but for purposes of cheapness and simplicity of construction I employ a permanent magnet. On brackets 2 2$^a$, of brass or other diamagnetic material, is mounted a shaft on which is fixed a conducting-disk 3, preferably formed of a metal having a small coefficient of resistance variation under changes of temperature. The disk projects through the air-gap, so as to be movable through the magnetic field maintained by the magnet. Connected to the shaft on which the disk is mounted is a flexible shaft 4, which terminates in a journaled handle 5, and a tapering pin 6, fixed to the flexible shaft, which may be pressed against the axis of the rotating body. When the disk 3 is revolved under the influence of the rotating body, Foucault or eddy currents are developed in the moving conductor or disk cutting the magnetic field, which are proportional in strength to the speed of rotation. These currents react upon the field and distort the same more or less, according to their strength, thus varying the magnetic reluctance of the air-gap. I provide a measuring device for this variation, which may be a small body of iron responsive to the variations of strength in the magnetic circuit and may be interposed in any suitable relation thereto, whether in series or in shunt. I prefer to mount a body of iron across an air-gap in a parallel magnetic circuit with the air-gap in which the disk rotates. For this purpose the magnet may be provided with auxiliary poles, which may be an integral part of the magnet-forging or may be mounted therein in any suitable way.

In order to provide the instrument with a wide range of speed indication, I provide for each magnetic system a plurality of interchangeable tubes or cylinders carrying armatures, index-needles, and scales. Each of these is constructed in like form, but with retarding-springs of different tension and different scale-markings, so that the range of deflection for a given speed and hence the range of indication are altered. The armature is mounted on an axis pivoted in the end caps 8 8$^a$ of a metal tube, such as brass or other diamagnetic material, one of which caps, as 8, is removable to permit mounting the moving element. The end of the tube is cut away, as seen at 9 in Fig. 2, to afford play to the index-needle 10. Soldered or otherwise secured to each cylinder are brackets 11 11$^a$, which support a scale 12. A hair-spring retractor 13 has one end fastened to the armature and the other end to the fixed cap 8ª. The non-magnetic cylinder carrying the armature 7, retracting-spring 13, index 10, brackets 11 11ª, and scale 12 is thus a unitary structure and fits snugly between the auxiliary poles of the magnet, it being supported in position by the brackets 11 11ª, resting on the legs of the magnet. The tube and parts carried thereby are thus readily removable in order to substitute a similar device having a spring of different tension to change the range of the instrument. As thus organized when the pin 6 is pressed against the rotating body motion is imparted to the disk 3 and the Foucault currents developed react in a degree varying with the speed of rotation upon the magnetic field and shunt more or less lines of force across the gap in which the movable armature is mounted, and a greater or less torque, according to the speed, is brought upon the armature 7, thus moving the pointer over the scale. If the deflection is too great for the scale, a cylinder carrying an armature and scale having higher readings may be substituted.

The scale may be calibrated by giving the movable device varying speeds and noting the deflections of the pointer. While the Foucault currents developed are in a simple ratio to the speed and the movements of the index will therefore also be a function of the speed, it is a more or less complex function, depending on the permeability of the magnetic circuit, the relative lengths of air-gap, and the tension of the spring.

While I have shown an effective and simple embodiment of the invention, I desire it to be understood that many designs quite remote in structural organization from that described might be employed to carry out its main features. It is only essential to produce a variable magnetic flux by a rotating device adapted to be connected with the rotating body and to provide a register or indicating device responsive to such varying flux.

What I claim as new, and desire to secure by Letters Patent of the United States, is—

1. A magnetic speed-indicator comprising a field-magnet, a movable armature and a movable low-resistance part in separated parts of the field of force of the magnet, one of the movable elements being revoluble and the other being oscillatory but biased to a normal position of rest, substantially as described.

2. A magnetic speed-indicator comprising a field-magnet having an oscillatory armature biased to a normal position of rest and a movable low-resistance part, the two being movable within separated parts of its magnetic field, substantially as described.

3. A magnetic speed-indicator, comprising a field-magnet having an oscillatory armature biased to a normal position of rest and a revoluble low-resistance part, movable within a separate part of the magnetic field, and a fixed electrical shield in juxtaposition to the armature, substantially as described.

4. A tachometer provided with a rotary device adapted for connection with the body whose speed is to be indicated, means for establishing a magnetic flux which is varied by said device under varying speeds, an indicator having a mechanical biasing device for registering the variations of flux, and a scale-plate having scale-markings thereon coöperating with the indicator.

5. A tachometer provided with means for establishing a field of force, a conductor moving relatively to said field, means for connecting said conductor to a shaft or moving body, and an indicator mounted in a separated part of the magnetic field to show the variations of field strength.

6. A tachometer provided with a closed electric circuit adapted to be rotated by the body whose speed is to be indicated, a magnetic field cut by said circuit, and an indicator mounted in a separate part of the magnetic field to show the strength of the reaction between the moving circuit and the magnetic field.

7. A tachometer provided with a conducting-disk mounted to rotate in a magnetic field, means for imparting motion to said disk by the body whose speed is to be indicated, and an indicator mounted in a separate part of the magnetic field responsive to changes of reluctance in the magnetic field under varying speeds of the disk.

8. A tachometer provided with a magnetic field, a metal disk mounted to rotate in an air-gap in said field, means for imparting motion to the disk by the body whose speed is to be indicated, an armature mounted in a separate part of the magnetic field responsive to the varying reluctance of the air-gap under the influence of varying speeds of the disk, and an indicator mounted on said armature.

9. A tachometer provided with a conducting-disk rotatably mounted in the air-gap of a magnetic field, means for imparting motion by a revolving body to said disk, an armature in a magnetic shunt around said air-gap, and an indicator mounted on said armature.

10. A tachometer provided with a conducting-disk rotatably mounted in the air-gap of a magnetic field, means for imparting motion from a revolving body to said disk, a retractile armature in a magnetic shunt around said air-gap, and an indicator mounted on said armature.

11. A tachometer provided with a conducting-disk mounted to rotate between the poles of a permanent magnet, and provided with means for imparting motion to the disk by the body whose speed is to be indicated, and a rectractile armature mounted in operative relation to a magnetic shunt around said poles.

12. A tachometer comprising means for establishing a field of force, a movable conductor mounted in said field, an indicator arranged to be mounted in a separated part of the same field in a definite relation to the movable conductor, and means for imparting rotary movement to the conductor.

13. A tachometer comprising means for establishing a field of force, means for varying the strength of the field of force according to the speed to be indicated, and an indicating element having a scale-plate attached thereto arranged to be mounted in said field of force in a definite relation to the parts of the instrument and to be removable therefrom.

14. A tachometer comprising a magnet, a closed electric circuit adapted to be revolved between the magnet-poles by the body whose speed is to be indicated, and an armature mounted in a separate part of the magnetic field controlled by the varying reluctance of the magnetic circuit and changes of speed of the rotating body.

15. A tachometer comprising a magnet, a closed electric circuit adapted to be revolved between the poles of the magnet by the body whose speed is to be indicated, an armature mounted in a separate part of the magnetic field controlled by the varying reluctance of the magnetic circuit, an indicator carried by the armature, and a damper to check the vibration of the armature.

16. A tachometer comprising means for establishing a field of force, a closed conductor movable relatively to said field, means for connecting the conductor to a moving body, and a magnetically-actuated indicating device removably mounted in a separated part of said field.

17. A tachometer comprising a magnet, a closed electric circuit adapted to be revolved between the magnet-poles by the body whose speed is to be indicated, a magnetic shunt for the magnet-poles, and a removable spring-retracted armature having an attached scale, said armature being operated by said magnetic shunt.

18. A tachometer comprising a magnet, a closed electric circuit adapted to be revolved between the magnet-poles by the body whose speed is to be indicated, a magnetic shunt for the magnet-poles, a removable tubular conductive shield having an attached scale adapted to be mounted in said shunt and a spring-retracted armature carried within said shield.

In witness whereof I have hereunto set my hand this 27th day of March, 1900.

CARYL D. HASKINS.

Witnesses:
ALEX. F. MACDONALD,
BENJAMIN B. HULL.